March 24, 1936.  C. O. GLENN  2,035,063

FLUID PRESSURE BRAKE

Filed Sept. 23, 1931    2 Sheets-Sheet 1

INVENTOR.
CARL O. GLENN
By Wm. M. Cady
ATTORNEY.

March 24, 1936.　　　　C. O. GLENN　　　　2,035,063
FLUID PRESSURE BRAKE
Filed Sept. 23, 1931　　　2 Sheets-Sheet 2

INVENTOR.
CARL O. GLENN
By Wm. M. Cady
ATTORNEY.

Patented Mar. 24, 1936

2,035,063

UNITED STATES PATENT OFFICE 2,035,063

FLUID PRESSURE BRAKE

Carl O. Glenn, Kansas City, Kans., assignor to The Westinghouse Air Brake Company, Wilmerding, Pa., a corporation of Pennsylvania Application September 23, 1931, Serial No. 564,546

38 Claims. (Cl. 303—39)

This invention relates to fluid pressure brakes, and more particularly to a fluid pressure brake equipment of the type adapted to operate upon a reduction in brake pipe pressure to effect an application of the brakes, and upon an increase in brake pipe pressure to effect a release of the brakes.

It is desirable, in controlling the brakes on a train, that the brakes on each car in the train respond quickly to a decrease in brake pipe pressure to effect an application of the brakes, and to an increase in brake pipe pressure to effect a release of the brakes, in order to avoid excessive shocks caused by the slack in the train running in and running out.

With the increase in train lengths, the difficulty of applying and releasing the brakes is correspondingly increased, particularly because of the slow rate of brake pipe reduction due to the length of the train, the discharging of the auxiliary reservoirs through the triple valve feed grooves into the brake pipe, and due to the fact that the brakes apply slowly because of the increased amount of air to be discharged from the brake pipe through the brake valve device. In order to ensure an application of the brakes on a long train, especially when the brake pipe leakage is of a minimum amount, it is therefore necessary, with the brake equipment at present employed, to effect an excessively heavy reduction in brake pipe pressure, which applies the brakes at the head of the train so much in advance of those at the rear that excessive shocks are produced.

One object of my invention is to provide an improved triple valve device which will operate upon a light reduction in brake pipe pressure to effect a local and predetermined quick service reduction in brake pipe pressure, which will be transmitted serially through the train, so as to hasten the rapidity and uniformity of brake application on all cars in the train and thereby obviate the above difficulty.

In carrying out this portion of my invention, the triple valve piston and graduating valve move upon a light reduction in brake pipe pressure to quick service position to effect a local quick service reduction in brake pipe pressure, and upon a further reduction to service position to continue the quick service reduction, if not completed, so as to ensure a predetermined and uniform local quick service reduction in brake pipe pressure.

In charging the brake pipe on a train, fluid under pressure is supplied through the usual brake valve device to the brake pipe at the front end of the train, and flows from the front end to the rear end of the train. Due to leakage of fluid under pressure from the brake pipe and to the resistance to flow of fluid under pressure through the brake pipe, the final pressure obtained in the brake pipe at the rear end of the train is considerably less than that in the front portion of the train, adjacent the source of supply. When the brake valve device is moved to service position to effect an application of the brakes, the supply of fluid to the brake pipe is cut off, and immediately the pressure in the front of the train reduces due to leakage from the brake pipe and due to flow toward the rear of the train in the tendency to equalize. The brake pipe pressure thus initially reduces in the front portion of the train ahead of and at a faster rate than in the rear portion of the train, but after the pressure at both ends of the train becomes substantially equal, the continued reduction is more uniform.

Another object of my invention is to hold back the operation of the triple valve devices to effect an application of the brakes until after the brake pipe pressure is reduced some predetermined amount, such as four pounds, at which time the brake pipe pressure at the front and rear ends of the train will be reducing more uniformly and thereby cause the brakes on the entire train to apply at substantially the same time.

In carrying out this feature of my invention, I provide a regulating valve device for cutting off the supply of fluid under pressure from the brake pipe to the auxiliary reservoir in charging the train, when the auxiliary reservoir is charged to a pressure, a predetermined degree less than the brake pipe pressure, so that in effecting an application of the brakes, the brake pipe pressure will have to be reduced slightly below the lower auxiliary reservoir pressure before the triple valve devices will respond to effect a quick service reduction in brake pipe pressure and an application of the brakes.

Difficulty is also encountered in effecting a uniform release of the brakes on a long train due to the fact that fluid under pressure is supplied to the brake pipe at only one end and has to flow to the other end. Thus, at the end of the train farthest from the source of supply, the rate of increase in brake pipe pressure is very slow relative to the rate of increase adjacent the source of supply.

Another object of my invention is to provide improved means for controlling the supply of fluid under pressure to the auxiliary reservoir and the release of fluid under pressure from the brake cylinder, such that the flow from the brake pipe to the auxiliary reservoir at the front of the train will be so restricted as to hasten the charging of the brake pipe in the rear portion of the train, and the release of fluid under pressure from the brake cylinder in the front portion of the train will be so restricted as to permit a release of the brakes at substantially the same time as the brakes at the rear of the train release.

In charging a train equipped with the usual brake apparatus, the auxiliary reservoirs near the source of fluid under pressure become overcharged when the brake valve is in the release position supplying fluid at high pressure directly from the main reservoir to the brake pipe. Then when the brake valve is moved to running position and the brake pipe pressure reduces to that supplied by the usual feed valve device, the higher auxiliary reservoir pressure in the brake equipments near the front of the train operates the usual triple valve devices to effect an undesired application of the brakes. It is then necessary for the brake valve to be again moved to release position an instant to kick the triple valve back to release position.

Another object of my invention is to provide means for preventing the auxiliary reservoir from becoming charged to a pressure higher than a predetermined degree, so as to obviate the above undesired condition.

Another object of my invention is to provide means for adjusting the degree of pressure, to which the auxiliary reservoir is charged, in accordance with the empty weight of a car, so as to obtain a more uniform retarding force on a train comprising cars of various empty weights, when an application of the brakes is effected.

Another object of my invention is to provide an improved triple valve device having associated quick action means operated independently of the triple valve device upon a sudden reduction in brake pipe pressure to locally vent fluid under pressure from the brake pipe at a predetermined rate for serially propagating quick action through a train, so as to ensure movement of the triple valve device to emergency position, and also operative to pilot the operation of the usual brake pipe venting mechanism of the triple valve device.

Other objects and advantages will appear in the following more detailed description of my invention.

In the accompanying drawings.

As shown in the drawings, the fluid pressure brake equipment comprises a brake controlling valve device such as a triple valve device 1, an auxiliary reservoir 2, a brake cylinder 3, and a quick service chamber or reservoir 4.

The triple valve device 1 comprises a body portion 5, upon which is mounted a cylinder cover 6, and the usual check valve portion 7.

The body portion 5 of the triple valve device contains a piston 8, having at one side a chamber 9 connected to the usual brake pipe 10, and at the other side a valve chamber 11 containing a main slide valve 12 and an auxiliary slide valve 13 adapted to be operated by said piston.

The triple valve piston 8 is provided on the valve chamber side with a seat rib 14 adapted to engage a gasket 15 disposed in the body, and also has a piston stem 16 extending into the valve chamber 11. The stem 16 is provided with the usual cavity adapted to operatively receive the auxiliary slide valve 13, and is also provided with the usual shoulder or collar 17 near one end, and the spider-like guide member 18 at the outer end, said collar and member being adapted to engage and operate the main slide valve 12 in the usual manner.

A chamber 19 is formed in the inner end of the piston stem 16 and is connected by a passage 20 in said stem to the piston chamber 9. The outer end of chamber 19 is formed by means of a cap or cover member 21 having screw-threaded engagement with the stem.

Disposed in a suitable bore in the member 21 and contained in chamber 19 is a valve 22, having a seat on said member and urged into engagement with said seat by means of a spring 23 also contained in chamber 19. Projecting from the valve 22 toward the triple valve piston 9 is a throttling pin 24, the conical end of which is adapted to govern the rate of flow of fluid under pressure from passage 20 to chamber 19 in accordance with the position of the triple valve device in a train, as will be hereinafter more fully described.

A valve device for regulating the charging of the auxiliary reservoir 2 is associated with the triple valve device and comprises a member 25 having screw-threaded engagement with said body. The member 25 is provided with a chamber forming an extension of the valve chamber 11 and connected through a passage and pipe 26 to the auxiliary reservoir 2. A flexible diaphragm 27 is operatively clamped in the member 25 between a shoulder 28 and a follower ring 29, which ring is subject to the pressure of a clamping nut 30 having screw-threaded engagement with member 25.

The diaphragm 27 forms at one side a chamber 31 open to the valve chamber 11 and at the other side a chamber 32 connected to the atmosphere through a passage 33. A follower plate 34 contained in chamber 32 engages one side of diaphragm 27. Said plate has a stem 35 extending in one direction and a screw-threaded stem 36 extending in the opposite direction through an opening in the diaphragm. Mounted in chamber 34 on the valve chamber side of the diaphragm 27 is another diaphragm follower preferably in the form of a piston 37. The diaphragm is clamped between the follower 34 and piston 37 by means of a nut 38 on the screw-threaded stem 36.

The diaphragm follower stem 35 slidably extends through a suitable bore in an adjusting nut 39 having screw-threaded engagement with the diaphragm clamping nut 30. Between the adjusting nut and follower 34 is a regulating spring 40 for exerting a pressure on one side of the diaphragm 27 in accordance with the adjusted position of the nut 39. A lock nut 41 having screw-threaded engagement with the nut 39 and adapted to engage the clamping nut 30 is provided for locking the nut 39 in an adjusted position.

The cylinder cover 6 forms the outer wall for the triple valve piston chamber 9 in the usual manner, and contained in said cover is a quick action mechanism which is adapted to pilot the operation of the usual vent valve mechanism of the triple valve device and also to effect a local emergency reduction in the brake pipe pressure as will be hereinafter described.

The quick action mechanism in the cylinder cover 6 comprises a flexible diaphragm 42 disposed between a shoulder 43 in the cover and one end of a slide valve bushing 44, and another diaphragm 45 of greater area than diaphragm 42, the diaphragm 45 being disposed between the other end of the slide valve bushing and a member 46 having screw-threaded engagement in the cover.

The diaphragm 42 has at one side a chamber 47 connected to the brake pipe 10 through passages 48 and 49 and the check valve chamber 50, and diaphragm 45 has at the opposite side a chamber 51 also connected to the brake pipe through passage 49 and chamber 50. A chamber 52 is formed intermediate said diaphragm and is at all times open to valve chamber 11 through a passage 53.

The diaphragms 42 and 45 are operatively connected together in order to operate a slide valve 54 slidably mounted on a suitable seat formed in the slide valve bushing 44. Contained in the chamber 52 is a member having at one end an enlarged portion or collar 55 engaging the diaphragm 42 and at the other end a similar enlarged portion or collar 56 engaging the diaphragm 45, and the slide valve 54 is operatively disposed between said collars. A follower plate 57 is mounted on the outer side of the diaphragm 45, while a follower member 58 is mounted on the outer face of the diaphragm 42. A valve seal 59 is provided in the member 58 and is adapted to engage a seat rib 60 in the cylinder cover for closing communication from chamber 47 to a passage 61 connected to the atmosphere through a restriction such as a choke 62. The valve seal 59 is engaged on its outer face by a retaining washer 63 and a bolt 64 is provided through said retaining ring, the follower member 58, diaphragm 42, the member intermediate the diaphragms 42 and 45, diaphragm 45 and follower plate 57 for operatively holding the quick action mechanism assembled.

A piston stop 65 is slidably mounted in a suitable opening in the member 46 and has a flange 66 adapted to engage said member. A spring 67 is interposed between said stop and the diaphragm follower plate 57 and normally maintains said stop and the quick action mechanism in the position shown in Fig. 1 of the drawings.

Contained in the triple valve body portion 5 and check valve portion 7 is the usual vent valve mechanism comprising a vent valve 68 contained in a chamber 69 and adapted to be unseated by an operating piston 70 against the opposing pressure of a spring 71 carried in the usual check valve 72.

In operation, fluid under pressure is supplied to the brake pipe 10 by the brake valve device (not shown) in the usual manner. From the brake pipe, fluid under pressure flows to chamber 50 and from thence through passage 49 to chamber 51 on one side of the quick action diaphragm 45, and from passage 49 through passage 48 to chamber 47 on the opposite side of the diaphragm 42. Since diaphragm 45 is of larger area than diaphragm 42, the pressure of fluid in chamber 51 acting on the differential area of diaphragm 45, in addition to the pressure of spring 67, urges the valve seal 59 into engagement with seat rib 60 so as to prevent loss of fluid under pressure from the brake pipe through passage 61 and choke 62 to the atmosphere.

Fluid at brake pipe pressure flows from chamber 51 through ports 73 in member 46 to the triple valve piston chamber 9. With the triple valve piston 8 and the valve 22 in the position shown in Figs. 1 and 3 of the drawings, fluid under pressure flows from chamber 9 through passage 20 in the triple valve piston stem 16, past the end of the throttling pin 24 into chamber 19, thence past valve 22 and through ports 86 to valve chamber 11 and from said valve chamber through passage and pipe 26 to the auxiliary reservoir 2.

The pressure of fluid in valve chamber 11 acts on the regulating piston 37 and diaphragm 27, and when the pressure in valve chamber 11 is built up to within a predetermined amount of the normal brake pipe pressure carried, such as four pounds less than brake pipe pressure, said pressure acting on diaphragm 27 deflects said diaphragm toward the right hand against the opposing and adjusted pressure of spring 40, it being understood that the spring 40 was previously adjusted by the adjusting nut 39 to regulate this operating pressure. This movement of the regulating piston 37 is limited by engagement of the follower plate 34 with a shoulder 94 in the clamping nut 30.

As the regulating piston 37 is thus moved to its right hand position, spring 23 seats the valve 22 so as to prevent further flow of fluid under pressure to the valve chamber 11 and auxiliary reservoir 2. As the brake pipe pressure is then further increased to for instance four pounds above the adjustment of spring 40, the pressure differential created on the triple valve piston 8 seals said piston on gasket 15 so as to prevent an undesired increase in pressure in valve chamber 11 due to leakage past said piston.

Figure 2:
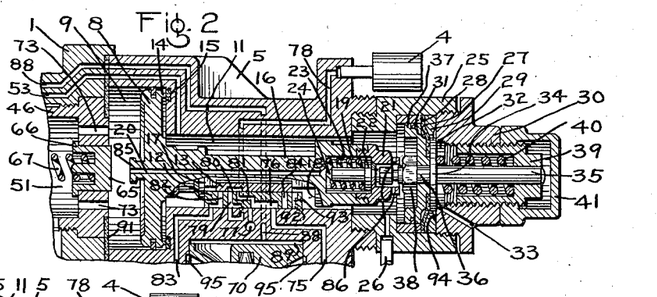
Figure 2 is a diagrammatic view of a portion of the brake controlling valve device shown in Figure 1 with the parts shown in the position finally assumed in the front and rear portions of a train in releasing the brakes after an application.

With the triple valve device in the release position just described, and as shown in Fig. 2, the brake cylinder 3 is open to the atmosphere through pipe and passage 74, passage 75, cavity 76 in the main slide valve 12 and atmospheric passage 77. The quick service reservoir 4 is also connected to the atmosphere through pipe and passage 78, port 79 in the main slide valve 12, cavity 80 in the auxiliary slide valve 13, port 81 and cavity 76 in the main slide valve 12 and atmospheric passage 77.

From valve chamber 11, fluid at auxiliary reservoir pressure flows through passage 53 to chamber 52 intermediate the quick action diaphragms 42 and 45. The pressure of fluid in chamber 52 being, for instance four pounds less than the brake pipe pressure acting on the outer face of each of said diaphragms, the differential of fluid pressures, plus the pressure of spring 67 maintains the valve seal 59 in engagement with seat rib 60.

If it is desired to effect a service application of the brakes, fluid under pressure is gradually vented from the brake pipe 10 and the connected triple valve piston chamber 9. Since the brake pipe is normally charged to a pressure in excess of the auxiliary reservoir pressure acting in valve chamber 11, the excess is initially vented before the pressure in chamber 9 can reduce below the pressure in valve chamber 11, during which time the valve 22 prevents back flow of fluid from the auxiliary reservoir 2 to the brake pipe 10.

When the pressure in piston chamber 9 is thus reduced to slightly below the pressure in valve chamber 11, for instance less than one pound, the auxiliary reservoir pressure in chamber 11 shifts the piston 8 and auxiliary slide valve 13 toward the left hand. This movement of the auxiliary slide valve 13 is relative to the main slide valve 12 and ceases in quick service position shown in Fig. 4 of the drawings, in which position spider 18 on the piston stem 16 engages the right hand end of the main slide valve 12.

In quick service position of the auxiliary slide valve, the cavity 80 connects ports 82 and 79 in the main slide valve. Port 79 is connected through passage and pipe 78 to the quick service reservoir 4 and port 82 is connected through passage 83 to the check valve chamber 69. This permits the pressure in chamber 69 to reduce into the quick service reservoir 4. The pressure in chamber 50 then lifts the check valve 72 against the opposing pressure of spring 71. With the check valve 72 unseated, fluid under pressure is vented from the brake pipe 10 through chamber 50 to chamber 69 and from thence to the quick service reservoir 4. This venting of fluid from the brake pipe to the quick service reservoir causes a local quick service reduction in brake pipe pressure before movement of the triple valve parts to service position.

Figures 4, 5:
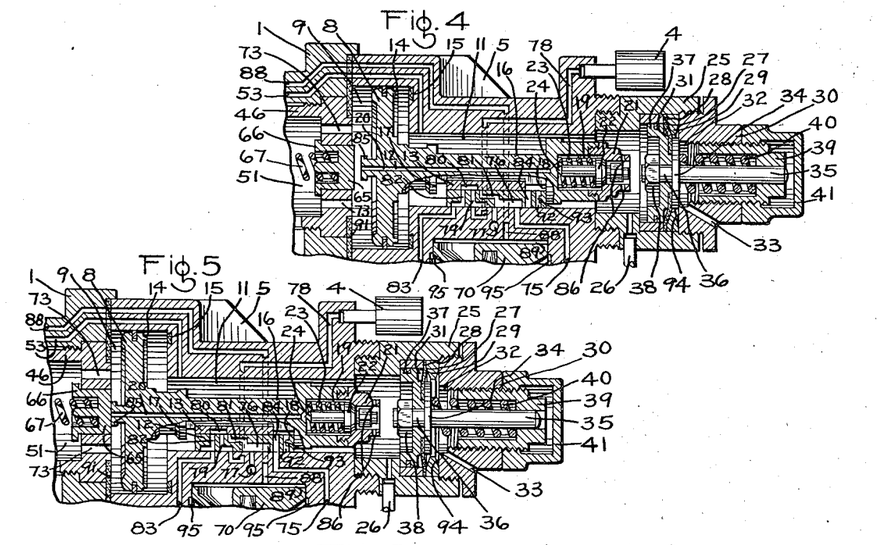
Figure 4 is a diagrammatic view of a portion of the brake controlling valve device shown in Figure 1 with the parts in quick service position.
Figure 5 is a diagrammatic view of a portion of the brake controlling valve device shown in Figure 1 with the parts shown in service position.

When a predetermined reduction of about five pounds in brake pipe pressure is effected in the manner above described, the auxiliary reservoir pressure in valve chamber 11 causes the piston 8 to move the main slide valve 12 to service position shown in Fig. 5, in which position the service port 84 in the main slide valve registers with the brake cylinder passage 75. Port 84 being uncovered by the initial movement of the auxiliary slide valve to quick service position, fluid under pressure then flows from the valve chamber 11 and connected auxiliary reservoir 2 through said port to passage 75 and thence through passage and pipe 74 to brake cylinder 3 and effects an application of the brakes.

In service position of the main slide valve 12, the quick service ports 82 and 79 maintain registry with passages 83 and 78, respectively, as in quick service position, so as to ensure equalization of brake pipe pressure into the quick service reservoir 4. This causes a predetermined and positive local quick service reduction in brake pipe pressure to be effected which is rapidly transmitted to the next car of the train, causing the triple valve device on said next car to operate in a similar manner, and so on throughout the length of the train. As a consequence, serial quick service action takes place in advance of the application of brakes on each car.

The cavity 80 in the auxiliary slide valve 13 is made of such length that when said slide valve is being moved from release position to quick service position, this cavity will partly uncover port 82, which is connected through passage 83 and past the check valve 72 to the brake pipe, and at the same time maintain communication with port 81 which is open to the atmosphere. As a result, if the movement of the triple valve to quick service position is sluggish, a venting of fluid under pressure from the brake pipe directly to the atmosphere will occur. The consequent reduction in brake pipe pressure is transmitted to chamber 9 of the triple valve device and effects prompt movement of the triple valve piston and auxiliary slide valve 13 to quick service position for effecting a quick service reduction in brake pipe pressure in the manner hereinbefore described.

Just before the piston 8 is moved into service position shown in Fig. 5, the projection 85 on said piston engages the stop 65, so that further movement of said piston into service position pushes said stop outwardly against the opposing pressure of spring 67. In the service position the projection 85 is adapted to effect a seal on the stop 65, so that if for any reason the valve 22 fails, fluid at auxiliary reservoir pressure is prevented from flowing from valve chamber 11 through passage 20 in the piston stem 16 to chamber 9 and from thence to the brake pipe, which would materially interfere with the application of the brakes. This seal is especially effective when an emergency application of the brakes is effected, since the brake pipe pressure is reduced to a low degree, as will be hereinafter described.

When the auxiliary reservoir pressure in valve chamber 11 is reduced in effecting an application of the brakes, the pressure of the regulating spring 49 overcomes the fluid pressure in chamber 11 acting on the regulating piston 37 and diaphragm 27 and moves same to the position shown in Fig. 3 for controlling the charging of the auxiliary reservoir 2 in releasing the brakes, as will be hereinafter described.

When the auxiliary reservoir pressure in valve chamber 11 is reduced by flow to the brake cylinder to a degree slightly less than the reduced brake pipe pressure, in effecting a service application of the brakes, the piston 8 moves the auxiliary slide valve 13 back to service lap position in which the service port 84 is lapped so as to cut off the supply of fluid under pressure to the brake cylinder. In thus moving from service position to service lap position, it will be noted that the quick service port 82 is closed slightly ahead of the service port 84, so that if a light, undesired reduction in brake pipe pressure should occur, such as due to brake pipe leakage, and cause the piston 8 and slide valve 13 to move from service lap position toward service position, the opening of the service port 84 ahead of the quick service port will permit auxiliary reservoir pressure to reduce into the brake cylinder. This will reduce the pressure in valve chamber 11 and cause the piston 8 and slide valve 13 to move back to service lap position before the quick service port 82 is opened, thereby preventing an undesired quick service application of the brakes.

In service lap position, the quick service reservoir 4 is vented to the atmosphere through pipe and passage 78, port 79 in the slide valve 12, cavity 80 in slide valve 13, port 81 and cavity 76 in slide valve 12, and atmospheric port 77. A portion of the port 81 in the main slide valve 12 is reduced in area so as to restrict this venting of fluid under pressure from the quick service reservoir 4, so that if a further reduction in brake pipe pressure is effected within a period of time governed by the rate of reduction in quick service reservoir pressure, the venting of brake pipe pressure to the quick service reservoir will be limited by the pressure of fluid still in the quick service reservoir. By these means, a full quick service reduction is obtained upon the initial reduction in brake pipe pressure in graduating an application of the brakes, but upon succeeding reductions, the quick service reduction and its consequent effect upon the car braking is reduced.

In order to effect a release of the brakes after an application, the brake pipe 10 is charged with fluid under pressure in the usual manner, i. e., the brake valve device (not shown) on the locomotive may be turned first to full release position for a certain length of time and then later turned and maintained in running position.

In full release position of the brake valve device, fluid at the high pressure carried in the usual main reservoir (not shown) is supplied directly to the brake pipe. This initial high pressure supplied to the brake pipe in the front portion of the train is adapted to augment the rate at which the brake pipe in the rear portion of the train is charged. After a certain length of time, the brake valve is turned from release position to running position in which the final charging of the brake pipe is adapted to be controlled by the usual feed valve device (not shown). When the brake valve device is turned from release position to running position, the high pressure in the brake pipe at the front portion of the train reduces by flow toward the rear of the train to the adjustment of the usual feed valve device, at which time the feed valve device starts to operate and then maintains the brake pipe pressure in the front portion of the train at its adjustment during the remainder of the charging period and while the brakes are released.

It will be evident that in charging the brake pipe to effect a release of the brakes after an application, the brake pipe pressure in the front portion of the train adjacent the source of fluid pressure supply, is increased at a rapid rate, but due especially to the resistance to flow of fluid under pressure through the brake pipe to the rear portion of the train, the brake pipe pressure in the rear portion of the train increases at a relatively slow rate. According to my invention, my improved triple valve device operates in accordance with the rate of increase in brake pipe pressure, or in other words in accordance with its position in a train, to so control the charging of the auxiliary reservoir 2 and the release of fluid under pressure from the brake cylinder 3 as to effect a substantially uniform release of the brakes on the entire train in the shortest possible time.

As hereinbefore described, the regulating piston 37 and diaphragm 27 are maintained in their left hand position, shown in Fig. 5 of the drawings, by the difference in pressure between the reduced auxiliary reservoir pressure in valve chamber 11 acting on one side of said diaphragm and the opposing pressure of the regulating spring 40 acting on the other side of said diaphragm.

Figure 1:
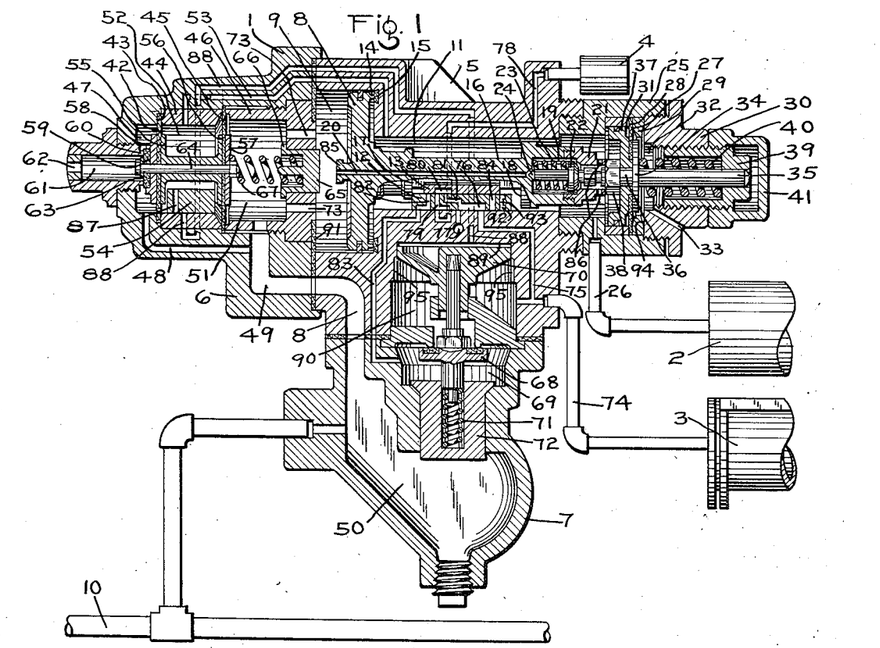
Figure 1 is a diagrammatic view, mainly in section, of a fluid pressure brake equipment embodying my invention and showing the parts in the position initially assumed in the front portion of a train in releasing the brakes after an application.

In releasing the brakes, if the rate and degree of increase in brake pipe pressure is high as in the front portion of the train, this high pressure acting in chamber 9 on the triple valve piston 8 moves said piston and the slide valves 12 and 13 from the service lap position to the retarded release and recharge position shown in Fig. 1. In thus moving, the end of cap 21 on the piston stem 16 engages the retaining nut 38 of the regulating piston 37 and moves said piston and diaphragm 28 toward the right hand to the position shown in Fig. 1, against the opposing pressure of the regulating spring 40. This movement is effected because the differential of pressures acting on the piston 8 exceeds the differential of pressures acting on the regulating diaphragm 27, and such movement is limited by engagement of seat rib 14 on the back of the piston 8 with the gasket 15, which prevents any leakage of fluid under pressure from piston chamber 9 past piston 8 to valve chamber 11 and from thence to the auxiliary reservoir 2.

Just before the cap 21 of piston stem 16 engages the retaining nut 38, as the triple valve piston moves to retarded release and recharge position, the stem of valve 22 engages the end 36 of the stem 35 of the regulating device so that the valve 22 is unseated when the end of cap 21 engages the retaining nut 38. In thus unseating the valve 22, the throttling pin 24 is pushed into the conical shaped opening of passage 20 so as to restrict the flow of fluid under pressure from the brake pipe through said passage to chamber 19 and from thence past the valve 22, and through ports 86 to valve chamber 11 and the connected auxiliary reservoir 2. By thus restricting the charging of the auxiliary reservoir to a predetermined amount and consequently restricting the amount of fluid under pressure taken from the brake pipe 10 in the front portion of the train, the brake pipe pressure in the rear portion of the train is increased at such a rate as to recharge the auxiliary reservoir 2 in the rear portion of the train at substantially the same time, as will be hereinafter described.

In the retarded release position of the slide valves 12 and 13, the cavity 76 in slide valve 12 partly covers the release port 77 as shown in Fig. 1 so as to restrict the venting of fluid under pressure from the brake cylinder 3 through pipe and passage 74, passage 75, cavity 76 and atmospheric passage 77. This causes a delay or slow release of the brakes in the front portion of the train so as to more nearly synchronize such release with the release of brakes in the rear portion of the train. In this retarded release position, the quick service reservoir 4 is connected through pipe and passage 78, port 79 in the slide valve 12, cavity 80 in the slide valve 13 and port 81 in slide valve 12 to cavity 76, so that fluid under pressure vents from said reservoir and reduces with the brake cylinder pressure which reduces through cavity 76, as above described.

When the auxiliary reservoir pressure acting in chamber 11 on the left hand side of the regulating piston 37 and diaphragm 27 is increased to within a predetermined amount, such as four pounds, of the brake pipe pressure supplied by the usual feed valve device to piston chamber 9, the opposing pressure of the regulating spring 40 is overcome and the regulating piston 37 and diaphragm 27 are moved relative to piston 9 to the position shown in Fig. 2. This permits spring 23 to seat valve 22 so as to prevent further increase in pressure in the valve chamber 11 and auxiliary reservoir 2. The difference in pressures in valve chamber 11 and piston chamber 9 then maintains the seat rib 14 on the right hand side of said piston in engagement with the gasket 15 so as to prevent leakage past said piston from building up auxiliary reservoir pressure in valve chamber 11 to the brake pipe pressure in chamber 9.

Figure 3:
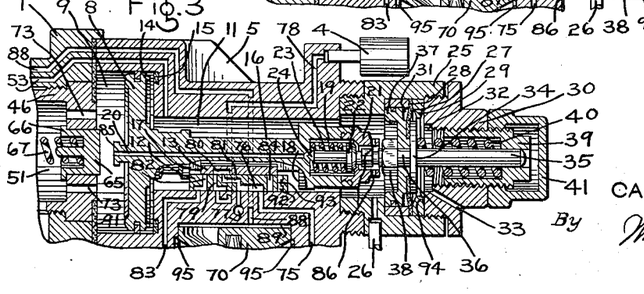
Figure 3 is a diagrammatic view of a portion of the brake controlling valve device shown in Figure 1 with the parts shown in the position initially assumed in the rear portion of the train in releasing the brakes after an application.

In the rear portion of the train where the rate of increase in brake pipe pressure is relatively slow, the increase in pressure in chamber 9 moves the piston 8 and slide valves 12 and 13 from service position shown in Fig. 5 toward the right hand to full release position as shown in Fig. 3. The regulating piston 37 and diaphragm 27 being in the service position, the stem of valve 22 engages the regulating stem 36 and unseats the valve 22. The unseating of valve 22 tends to operate the throttle pin 24 so as to restrict the flow of fluid under pressure from passage 20 to chamber 19 and thence to the auxiliary reservoir 2 as occurs when the rate of increase in brake pipe pressure is rapid as in the front portion of the train, but this is not the case when the rate of increase in brake pipe pressure is slow as in the rear portion of the train, for the reason that as soon as the valve 22 is cracked open or only partly unseated, it permits flow of fluid from piston chamber 9 to the valve chamber 11 and auxiliary reservoir 2 at nearly the same rate as the brake pipe pressure in piston chamber 9 is increased. When the pressure in valve chamber 11 is thus increased sufficiently to overcome the opposing pressure of the regulating spring 40, the regulating piston 37 and diaphragm 27 are moved to the position shown in Fig. 2 and this permits spring 23 to seat the valve 22 and prevent further increase in auxiliary reservoir pressure. In the release position shown in Fig. 3, the seat rib 14 on piston 9 is not initially moved into engagement with gasket 15, however, after the valve 22 is seated, the further increase in brake pipe pressure to four pounds above the pressure in valve chamber 11 moves said piston and the slide valves to the position shown in Fig. 2.

When the slide valves 12 and 13 are moved to the release position shown in Fig. 3, the release cavity 76 in the main slide valve 12 opens unrestricted communication between passage 75 from the brake cylinder 3 and the atmospheric passage 77 so as to permit an unrestricted release of fluid under pressure from the brake cylinder, which is adapted to effect a release of the brakes on the rear portion of the train at substantially the same time as the brakes on the front portion of the train are released. At the same time as the brakes are released, fluid under pressure is vented from the quick service reservoir 4 in the same manner as hereinbefore described. It will here be noted that the slide valves are initially moved to the unrestricted release position shown in Fig. 3 and then after the seating of valve 22, said slide valves are moved to the position shown in Fig. 2 in which the exhaust opening from the brake cylinder through cavity 76 is restricted. Prior to moving to the restricted release position, however, the release of brakes will be substantially complete and the final movement will have no effect upon said release.

If it is desired to effect an emergency application of the brakes, the usual brake valve device is operated to initiate a sudden reduction in brake pipe pressure and thereby suddenly vent fluid under pressure from chambers 47 and 51 at the outer face of the quick action diaphragms 42 and 45, respectively. The area of diaphragm 45 is sufficiently greater than that of diaphragm 42, that when the brake pipe pressure is thus suddenly reduced, auxiliary reservoir pressure in chamber 52 deflects said diaphragms toward the right hand against the opposing pressure of spring 67 and thereby moves valve seat 59 away from seat rib 60 and permits fluid under pressure to be suddenly vented from the brake pipe 10 through the passage 61 and choke 62 to the atmosphere for serially propagating quick action from car to car throughout the train in the usual manner.

It is desirable to effect a sudden emergency reduction in brake pipe pressure at a very rapid rate, but in order to do so the rate of venting must be controlled as by the choke 62 so as to prevent creating disturbances in the brake pipe such as a turbulence or the formation of eddy currents which materially interferes in obtaining the desired result.

Figure 6:
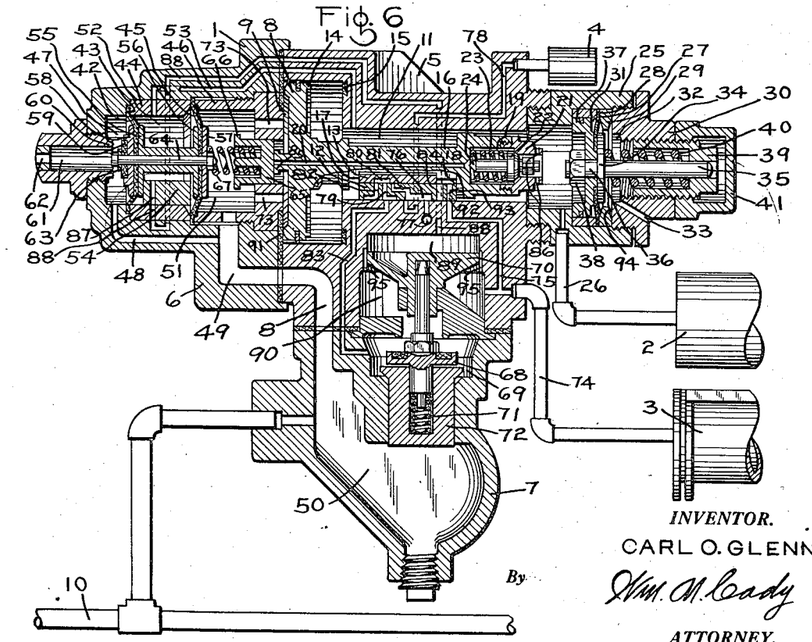
Figure 6 is a diagrammatic view of the brake controlling valve device shown in Figure 1 with the parts shown in the emergency position assumed immediately after a sudden reduction in brake pipe pressure is initiated.

When the quick action diaphragms 42 and 45 move to their venting position shown in Fig. 6, the slide valve 54 is moved by said diaphragms to a position in which a port 87 registers with passage 88 connected to chamber 89 at one side of the triple valve emergency piston 70. Fluid at auxiliary reservoir pressure is thus permitted to flow from the quick action diaphragm chamber 52 to the emergency piston chamber 88. Chamber 90 at the lower side of the emergency piston 70 being open at all times to the brake cylinder 3, the pressure of fluid supplied to chamber 89 moves the quick action piston 70 downwardly and unseats the vent valve 68 which vents fluid under pressure from chamber 69 to the brake cylinder. Fluid at brake pipe pressure in chamber 50 then lifts the check valve 72 and flows through chamber 69, past the vent valve 68 and to the brake cylinder 3. The operation of the vent valve 68 immediately follows the unseating of the quick action valve seal 59 from seat rib 60 and consequently aids, by venting fluid under pressure to the brake cylinder, to obtain the desired propagation of quick action as above described, and furthermore augments the emergency brake cylinder pressure to some predetermined degree.

In effecting an emergency application of the brakes, the triple valve piston 8 and auxiliary slide valve 13 move first to quick service position in which a local quick service venting of fluid under pressure from the brake pipe to the quick service reservoir 4 occurs and this aids in reducing brake pipe pressure in the same manner as when a service application of the brakes is effected. Equalization of the brake pipe pressure into the quick service reservoir may not be obtained however as when a service application of the brakes is effected, due to the venting of fluid under pressure from the brake pipe through the quick action mechanism and vent valve mechanism as hereinbefore described. Hence, the triple valve piston 8 and auxiliary slide valve 13 may hesitate in quick service position only momentarily and will then move promptly with the main slide valve 12 to emergency position shown in Fig. 6, in which position the piston 8 stops against the gasket 91.

In emergency position of the main slide valve 12, port 92 registers with passage 75 leading to the brake cylinder 3, which permits fluid under pressure to flow from the auxiliary reservoir 2 to said brake cylinder to effect an emergency application of the brakes. The rate of flow through port 92 is controlled by a choke 93 which so governs the rate of increase in brake cylinder pressure as to prevent damage to the cars in the train.

The operation of the triple valve piston 8 and slide valves 12 and 13 to vent fluid under pressure from the auxiliary reservoir to the brake cylinder occurs immediately following the operation of the quick action diaphragms 43 and 45 to vent fluid under pressure from the brake pipe, so that at substantially the same time as brake pipe pressure is reducing in the chambers 47 and 51, auxiliary reservoir pressure is reducing in chamber 52 between the diaphragms 42 and 45. The areas of said diaphragms are so proportioned to each other and to the value of spring 67, that when the brake pipe pressure is reduced to a predetermined degree, such as for example 30 pounds, assuming seventy pounds to be the normal brake pipe pressure carried, the auxiliary reservoir pressure in chamber 52 will also be reduced to a pressure which will permit spring 67 to deflect said diaphragms to their left hand position in which the valve seat 59 engages the seat rib 60 and the slide valve 54 laps passage 88. In this manner the brake pipe pressure is reduced only a predetermined degree lower than the pressure obtained by equalization of the auxiliary reservoir and brake cylinder, the degree of brake pipe reduction being however sufficient to ensure a full emergency application of the brakes. By thus limiting the degree of reduction in brake pipe pressure, the brake pipe is maintained partly charged and requires less fluid under pressure to effect a release of the brakes, which will materially hasten said release.

In order to thus limit the emergency reduction in brake pipe pressure, the brake valve device (not shown) is permitted to remain in the emergency position only a sufficient period of time to ensure the emergency operation of the brake controlling valve devices on the cars in the train and then the brake valve device is moved to lap position so as to bottle up the brake pipe when the quick action valve seat 59 is moved into engagement with seat rib 60, as above described.

When the vent valve piston 70 is in the venting position shown in Fig. 6, a plurality of by-pass grooves 95 connect chamber 89 at one side to chamber 90 at the other side but these grooves do not interfere with the operation hereinbefore described, since the rate of supply of fluid to chamber 89 exceeds the venting capacity of said grooves. When the brake cylinder pressure acting in piston chamber 90 is built up to substantially the pressure acting in chamber 89, the pressure of spring 71 urges the vent valve 68 to its seat and moves the piston 70 upwardly, the grooves 95 around said piston permitting flow of fluid under pressure from chamber 89 to chamber 90 to offset the displacement of said piston. The grooves 95 are lapped by said piston before its normal position is reached, however, in order to prevent leakage from chamber 89 so as to better ensure prompt movement of piston 70 when fluid under pressure is being supplied to chamber 89 in initiating an emergency application of the brakes.

When the triple valve piston 8 is in emergency position, the projection 85 engages stop 65 and moves said stop to the position shown in Fig. 6, in which position passage 20 is sealed so as to prevent back flow from the auxiliary reservoir 2 and valve chamber 11 to the brake pipe 10 in case the valve 22 should for any reason become unseated.

As hereinbefore described, the regulating spring 40 is adjusted to limit the auxiliary reservoir pressure to a predetermined degree less than brake pipe pressure. In a train of cars, some heavy and some light, it is obvious that with the same brake equipment charged to the same pressure, the braking power developed on the heavier cars will be less than that obtained on the lighter cars. According to the invention, the braking effect on the heavy and light cars can be substantially equalized by the proper adjustment of the regulating spring 40. Assuming that the brake pipe pressure carried is seventy pounds, the spring 40 is adjusted to limit the auxiliary reservoir pressure on the heavy cars to sixty-six pounds for reasons hereinbefore explained, but the spring 40 is adjusted on the light cars to limit the auxiliary reservoir pressure to sixty pounds or some other pressure less than that permitted on the heavy cars. As a result of these different adjustments, the brake cylinder pressure obtained on the heavy cars for instance by a twenty pound reduction in brake pipe pressure will exceed the brake cylinder pressure obtained on the light cars by a degree proportionate to the difference in car weight and as a result, a substantially uniform braking on each car in the train will be obtained.

From the above description of the construction and operation it will be seen that a brake controlling valve device is provided having improved means operative in accordance with the rate of increase in brake pipe pressure in effecting a release of the brakes, to control the release of fluid under pressure from the brake cylinder and the supply of fluid under pressure to the auxiliary reservoir in such a manner as to effect a substantially uniform release of the brakes in the front and rear portions of a train, and to increase the rate of charging of the auxiliary reservoirs in the rear portion of the train and thereby better ensure movement of the brake controlling valve devices in the rear portion of the train to the release position. The pressure in the auxiliary reservoir is limited to some predetermined degree less than brake pipe pressure so as to obtain a more uniform application of the brakes in the front and rear portions of the train and the limiting means is also adapted to vary the auxiliary reservoir pressure on cars of different weights so as to obtain a substantially uniform braking effect on all cars in a train. Improved quick service operation is obtained by the movement of the triple valve piston and auxiliary slide valve, for hastening a service application of the brakes. Improved means are also provided which operate independently of the triple valve portion of the brake controlling valve device for ensuring and rapidly propagating emergency action serially through a train and these means are so arranged as to pilot the operation of the usual vent valve mechanism in the triple valve device which aids in effecting the emergency reduction in brake pipe pressure.

While one illustrative embodiment of the invention has been described in detail, it is not my intention to limit its scope to that embodiment or otherwise than by the terms of the appended claims.

Having now described my invention, what I claim as new and desire to secure by Letters Patent, is:

1. In a fluid pressure brake, the combination with a brake pipe and a quick service reservoir, of a brake controlling valve device comprising a valve having a release position and movable therefrom upon a reduction in brake pipe pressure to a quick service position for connecting said brake pipe to said reservoir, said valve being operative in its traverse from release position to quick service position to connect said brake pipe to the atmosphere.

2. In a fluid pressure brake, the combination with a brake pipe and a quick service reservoir, of a brake controlling valve device having a release position and movable upon a reduction in brake pipe pressure first to a quick service position for connecting said brake pipe to said reservoir and to the atmosphere, and then to a brake applying position in which the brake pipe is maintained in communication with said reservoir and the atmospheric connection to said reservoir is closed.

3. In a fluid pressure brake, the combination with a brake pipe and a quick service reservoir, of a brake controlling valve device comprising a main slide valve having a release position and a passage extending through said slide valve and connected to the atmosphere, an auxiliary slide valve for normally establishing communication from said reservoir to said passage and operative upon a predetermined relative movement to said main slide valve to connect said brake pipe to said reservoir and to said passage, and operative upon further relative movement to close communication from said brake pipe to said passage, and a piston operative upon a reduction in brake pipe pressure to effect said relative movement.

4. In a fluid pressure brake, the combination with a brake pipe, an auxiliary reservoir, a brake cylinder, and a quick service reservoir, of a brake controlling valve device operative upon a reduction in brake pipe pressure to vent fluid under pressure from the brake pipe to said quick service reservoir and to supply fluid under pressure from said auxiliary reservoir to said brake cylinder, and operative when the auxiliary reservoir pressure is lower than the brake pipe pressure to cut off the supply of fluid under pressure to said brake cylinder and to establish a communication through which fluid under pressure is vented from said quick service reservoir, and means in said communication for restricting the venting of fluid under pressure from said quick service reservoir.

5. In a fluid pressure brake, the combination with a brake pipe, an auxiliary reservoir, a brake cylinder and a quick service reservoir, of a brake controlling valve device comprising a movable abutment subject to the opposing pressures of the brake pipe and auxiliary reservoir, and a slide valve operated by said abutment upon a reduction in brake pipe pressure, subsequent to the initial reduction in brake pipe pressure in effecting a graduated application of brakes, for first establishing communication from said auxiliary reservoir to said brake cylinder and then from said brake pipe to said quick service reservoir.

6. In a fluid pressure brake, the combination with a brake pipe, an auxiliary reservoir, a brake cylinder and a quick service reservoir, of a brake controlling valve device operative upon a reduction in brake pipe pressure to vent fluid under pressure from said brake pipe to said quick service reservoir, and to supply fluid under pressure from said auxiliary reservoir to said brake cylinder, and operative when the auxiliary reservoir pressure is reduced below the brake pipe pressure to close the communication from said brake pipe to said quick service reservoir and the communication from the auxiliary reservoir to said brake cylinder, said valve device being operative upon a further reduction in brake pipe pressure to open the last mentioned communication ahead of the first mentioned communication.

7. In a fluid pressure brake, the combination with a brake pipe, an auxiliary reservoir, a brake cylinder and a quick service reservoir, of a brake controlling valve device operative upon a reduction in brake pipe pressure to vent fluid under pressure from said brake pipe to said quick service reservoir, and to supply fluid under pressure from said auxiliary reservoir to said brake cylinder, and operative when the auxiliary reservoir pressure is reduced below the brake pipe pressure to establish a communication from said quick service reservoir to the atmosphere and to close the communication from said auxiliary reservoir to said brake cylinder, said valve device being operative upon a further reduction in brake pipe pressure to open the last mentioned communication and to connect said brake pipe to said quick service reservoir after the auxiliary reservoir is connected to said brake cylinder.

8. In a fluid pressure brake, the combination with a brake pipe, an auxiliary reservoir, a brake cylinder and a quick service reservoir, of a brake controlling valve device operative upon a reduction in brake pipe pressure to vent fluid under pressure from said brake pipe to said quick service reservoir, and to supply fluid under pressure from said auxiliary reservoir to said brake cylinder, and operative when the auxiliary reservoir pressure is reduced below the brake pipe pressure to establish a communication from said quick service reservoir to the atmosphere and to close the communication from said auxiliary reservoir to said brake cylinder, flow restricting means in the communication from said quick service reservoir to the atmosphere, said valve device being operative upon a further reduction in brake pipe pressure to open the communication from the auxiliary reservoir to the brake cylinder and to connect the brake pipe to said quick service reservoir after the auxiliary reservoir is connected to the brake cylinder.

9. In a fluid pressure brake, the combination with a brake pipe and an auxiliary reservoir adapted to be charged with fluid under pressure from said brake pipe through only one communication, of valve means operated upon an increase in brake pipe pressure to open said communication, a spring, and means controlled by the opposing pressures of fluid in said auxiliary reservoir and said spring for permitting said valve means to close said communication when the pressure obtained in said auxiliary reservoir and acting on said means overcomes the opposing pressure of said spring.

10. In a fluid pressure broke, the combination with a brake pipe and an auxiliary reservoir adapted to be charged with fluid under pressure from said brake pipe through only one communication, of valve means operated upon an increase in brake pipe pressure to open said communication and operative upon a predetermined increase in auxiliary reservoir pressure to close said communication, a spring, and a movable abutment subject to the opposing pressures of the auxiliary reservoir and said spring for controlling the operation of said valve means.

11. In a fluid pressure brake, the combination with a brake pipe, an auxiliary reservoir and a movable abutment subject to the opposing pressures of the auxiliary reservoir and a spring, of a piston subject to brake pipe pressures, valve means operated by movement of said piston relative to said abutment upon an increase in brake pipe pressure for supplying fluid under pressure from said brake pipe to said auxiliary reservoir, said valve means being operated upon movement of said abutment relative to said piston when a predetermined auxiliary reservoir pressure is obtained for cutting off the supply of fluid under pressure from the brake pipe to the auxiliary reservoir, and a spring for moving said valve to cut off said supply of fluid under pressure.

12. In a fluid pressure brake, the combination with a brake pipe and an auxiliary reservoir, of valve means operative upon an increase in brake pipe pressure to establish communication from said brake pipe to said auxiliary reservoir and to close said communication upon a predetermined increase in auxiliary reservoir pressure, a movable abutment for controlling said valve means and subject on one side to auxiliary reservoir pressure, a spring acting on the opposite side of said abutment, and means for varying the pressure of said spring.

13. In a fluid pressure brake, the combination with a brake pipe and an auxiliary reservoir, of valve means having a position for establishing communication from said brake pipe to said auxiliary reservoir, a gasket, an abutment for moving said valve means to said position and adapted to engage said gasket in said position, and means subject to the opposing pressures of the auxiliary reservoir and a fixed pressure for operating said valve means in said position to open said communication, said means being operated upon a predetermined increase in auxiliary reservoir pressure to permit said valve means to close said communication.

14. In a fluid pressure brake, the combination with a brake pipe and an auxiliary reservoir, of movable valve means having one position for opening communication from said brake pipe to said auxiliary reservoir and another position for closing said communication, an abutment subject to the opposing pressures of the auxiliary reservoir and a fixed pressure for controlling the position of said valve means and operative upon a predetermined increase in auxiliary reservoir pressure to permit said valve means to close said communication, a piston operated upon an increase in brake pipe pressure to position said valve means for control by said abutment, and a gasket engageable by said piston upon closing said communication.

15. In a fluid pressure brake, the combination with a brake pipe and an auxiliary reservoir, of a brake controlling valve device having a passage through which fluid under pressure is adapted to be supplied from said brake pipe to said auxiliary reservoir, said valve device comprising means operative to restrict the flow of fluid under pressure from said brake pipe to said auxiliary reservoir, a spring acting on said means, an abutment, and a piston subject to the opposing pressures of the brake pipe and auxiliary reservoir and cooperative with said abutment to operate said means upon an increase in brake pipe pressure, when the pressure differential on said piston is sufficient to overcome the pressure of said spring.

16. In a fluid pressure brake, the combination with a brake pipe and an auxiliary reservoir, of a brake controlling valve device having a passage through which fluid under pressure is adapted to be supplied from said brake pipe to said auxiliary reservoir, said valve device comprising pressure sensitive means for governing the degree of pressure obtained in said auxiliary reservoir, means for varying the rate of flow of fluid under pressure through said passage and a piston subject to the opposing pressures of the brake pipe and auxiliary reservoir, and cooperative with said pressure sensitive means for controlling the operation of said means.

17. In a fluid pressure brake, the combination with a brake pipe and an auxiliary reservoir, of a triple valve device comprising piston means subject to the opposing pressures of the brake pipe and auxiliary reservoir, an abutment subject to the opposing pressures of the auxiliary reservoir and a spring, a valve in said piston means operative by engagement with said abutment upon an increase in brake pipe pressure for establishing communication from said brake pipe to said auxiliary reservoir, said abutment being movable out of engagement with said valve when the auxiliary reservoir pressure is increased to a degree sufficient to overcome the pressure of said spring, and another spring for seating said valve.

18. In a fluid pressure brake, the combination with a brake pipe and an auxiliary reservoir, of a triple valve device comprising piston means subject to the opposing pressures of the brake pipe and auxiliary reservoir, and movable to a certain position upon a rapid rate of increase in brake pipe pressure, said piston means having a passage for supplying fluid under pressure from said brake pipe to said auxiliary reservoir, an abutment and means operated by said abutment when said piston means is moved to said position for restricting the flow of fluid under pressure through said passage.

19. In a fluid pressure brake, the combination with a brake pipe and an auxiliary reservoir, of a triple valve device comprising piston means subject to the opposing pressures of the brake pipe and auxiliary reservoir, and having a passage for supplying fluid under pressure from said brake pipe to said auxiliary reservoir, an abutment subject to the opposing pressures of the auxiliary reservoir and a spring, a valve in said piston means operative by engagement with said abutment upon an increase in brake pipe pressure for opening communication from the brake pipe to the auxiliary reservoir through said passage, resilient means for operating said valve to close said communication, and means associated with said valve for restricting the rate of flow of fluid under pressure through said passage when the pressure differential on said piston is sufficient to overcome said resilient means, said abutment being movable out of engagement with said valve when the auxiliary reservoir is charged to a pressure sufficient to overcome the opposing pressure of said spring.

20. In a fluid pressure brake, the combination with a brake pipe and a reservoir, of a valve device operative upon a reduction of brake pipe pressure to vent fluid under pressure from said reservoir, said valve device comprising a piston having a passage through which fluid under pressure is supplied from said brake pipe to said reservoir upon an increase in brake pipe pressure, and means operative only upon a reduction in brake pipe pressure to close communication from said reservoir to the brake pipe through said passage.

21. In a fluid pressure brake, the combination with a brake pipe and a reservoir, of a valve device operative upon a reduction in brake pipe pressure to vent fluid under pressure from said reservoir, said valve device comprising a piston having a passage through which fluid under pressure is supplied from said brake pipe to said reservoir upon an increase in brake pipe pressure, and resilient means operative only upon a reduction in brake pipe pressure to close communication from said reservoir to the brake pipe through said passage.

22. In a fluid pressure brake, the combination with a brake pipe and a reservoir, of a valve device operative upon a reduction in brake pipe pressure to vent fluid under pressure from said reservoir, said valve device comprising a piston having a passage through which fluid under pressure is supplied from said brake pipe to said reservoir upon an increase in brake pipe pressure, and spring-pressed means operative only upon a reduction in brake pipe pressure to close communication from said reservoir to the brake pipe through said passage.

23. In a fluid pressure brake, the combination with a brake pipe, an auxiliary reservoir, and a brake cylinder, of a brake controlling valve device movable to emergency position to supply fluid under pressure from said auxiliary reservoir to said brake cylinder, said valve device comprising a piston and resilient means acting on said piston in emergency position, and valve means operated by auxiliary reservoir pressure upon a sudden reduction in brake pipe pressure to establish communication from the brake pipe to the atmosphere for effecting the movement of said valve device to emergency position, said valve means being operative by said resilient means to close said communication upon a predetermined reduction in auxiliary reservoir pressure.

24. In a fluid pressure brake, the combination with a brake pipe, an auxiliary reservoir, and a brake cylinder, of a brake controlling valve device movable to emergency position to supply fluid under pressure from said auxiliary reservoir to said brake cylinder, valve means for venting fluid under pressure from said brake pipe to said brake cylinder, and means operated by auxiliary reservoir pressure upon a sudden reduction in brake pipe pressure for piloting the operation of said valve means and for venting fluid under pressure from the brake pipe for effecting the movement of said brake controlling valve device to emergency position.

25. In a fluid pressure brake, the combination with a brake pipe, an auxiliary reservoir, and a brake cylinder, of a brake controlling valve device movable to emergency position to supply fluid under pressure from said auxiliary reservoir to said brake cylinder, valve means operated by fluid under pressure for venting fluid under pressure from said brake pipe to said brake cylinder, and means operated by auxiliary reservoir pressure upon a sudden reduction in brake pipe pressure to supply fluid under pressure to said valve means, and to vent fluid under pressure from said brake pipe for effecting the movement of said brake controlling valve device to emergency position.

26. In a fluid pressure brake, the combination with a brake pipe, an auxiliary reservoir, and a brake cylinder, of a brake controlling valve device movable to emergency position to supply fluid under pressure from said auxiliary reservoir to said brake cylinder, valve means operated by fluid under pressure for venting fluid under pressure from said brake pipe to said brake cylinder, and means operated by auxiliary reservoir pressure upon a sudden reduction in brake pipe pressure to supply fluid under pressure to said valve means, and to vent fluid under pressure from said brake pipe for effecting the movement of said brake controlling valve device to emergency position, and a spring for operating said means upon a predetermined reduction in auxiliary reservoir pressure and brake pipe pressure to cut off the supply of fluid under pressure to said valve means and to close communication from the brake pipe to the atmosphere.

27. In a fluid pressure brake, the combination with a brake pipe, a brake cylinder, and an auxiliary reservoir, of a brake controlling valve device movable to emergency position upon a reduction in brake pipe pressure for supplying fluid under pressure from said auxiliary reservoir to said brake cylinder, said valve device comprising a piston and a spring adapted to be compressed by said piston in said position, vent valve means operated by fluid under pressure from said auxiliary reservoir for venting fluid under pressure from said brake pipe to said brake cylinder, and quick action means operative upon a sudden reduction in brake pipe pressure to vent fluid under pressure from said brake pipe for effecting the movement of said brake controlling valve device to emergency position and for supplying fluid under pressure from said auxiliary reservoir to said vent valve means, said quick action means being operative by said spring upon a predetermined reduction in auxiliary reservoir pressure and brake pipe pressure to stop the venting of fluid under pressure from the brake pipe and to cut off the supply of fluid under pressure to said vent valve means, said quick action means comprising two connected abutments of different areas subject on their adjacent sides to auxiliary reservoir pressure and on their outer sides to brake pipe pressure, one of said abutments engaging said spring, a vent valve controlled by the other of said abutments, and a slide valve operatively disposed between said abutments for controlling communication from said auxiliary reservoir to said quick action means.

28. In a fluid pressure brake, the combination with a brake pipe and an auxiliary reservoir adapted to be charged with fluid under pressure from said brake pipe through only one communication, of a movable abutment subject to the opposing pressures of the auxiliary reservoir and a spring, valve means operative by said abutment upon an increase in brake pipe pressure to open said communication for supplying fluid under pressure from said brake pipe to said auxiliary reservoir, and means for operating said valve means to close said communication when the pressure in said auxiliary reservoir pressure exceeds the pressure of said spring.

29. In a fluid pressure brake, the combination with a brake pipe and an auxiliary reservoir, of a brake controlling valve device having means for supplying fluid under pressure from said brake pipe to said auxiliary reservoir and comprising a stop member and a movable abutment subject to the opposing pressures of said brake pipe and said auxiliary reservoir, said abutment being cooperative with said stop member upon a reduction in brake pipe pressure for closing communication through said means.

30. In a fluid pressure brake, the combination with a brake pipe and an auxiliary reservoir, of a brake controlling valve device having means for supplying fluid under pressure from said brake pipe to said auxiliary reservoir and comprising a stop member and a movable abutment subject to the opposing pressures of said brake pipe and said auxiliary reservoir, said abutment being adapted to move into engagement with said stop member upon a reduction in brake pipe pressure for closing communication through said means.

31. In a fluid pressure brake, the combination with a brake pipe, and an auxiliary reservoir, of a triple valve device comprising a stop member, a movable abutment subject to the opposing pressures of the brake pipe and auxiliary reservoir and having means through which fluid under pressure is adapted to be supplied from said brake pipe to said auxiliary reservoir, said abutment being operative upon a reduction in brake pipe pressure to engage said stop member for closing communication through said means.

32. In a fluid pressure brake, the combination with a brake pipe, and an auxiliary reservoir, of a triple valve device comprising a stop member, a piston having a passage through which fluid under pressure is adapted to be supplied from said brake pipe to said auxiliary reservoir, a valve controlled by said piston and operative to open communication through said passage upon an increase in brake pipe pressure on said piston, and a spring for operating said valve to close said communication, said piston being operative upon a reduction in brake pipe pressure to engage said stop member for also closing said communication.

33. In a fluid pressure brake, the combination with a brake pipe, and an auxiliary reservoir, of valve means operative upon a sudden reduction in brake pipe pressure for locally venting fluid under pressure from said brake pipe, said valve means comprising a vent valve for venting fluid under pressure from said brake pipe, and two connected movable abutments for controlling the operation of said vent valve, said abutments being of different areas and having an intermediate chamber connected to said auxiliary reservoir, the outer face of each of said abutments being subject to brake pipe pressure.

34. In a fluid pressure brake, the combination with a brake pipe and an auxiliary reservoir, of valve means operative upon a sudden reduction in brake pipe pressure for locally venting fluid under pressure from said brake pipe, said valve means comprising a movable abutment, a vent valve operative by said abutment to vent fluid under pressure from said brake pipe, and another movable abutment of larger area than the first mentioned movable abutment and operatively connected thereto, said abutments cooperating to form a chamber communicating with said auxiliary reservoir, the outer face of each of said abutments being subject to brake pipe pressure.

35. In a fluid pressure brake, the combination with a brake pipe and an auxiliary reservoir, of valve means operative upon a sudden reduction in brake pipe pressure for locally venting fluid under pressure from said brake pipe, said valve means comprising a movable abutment, a vent valve operative by said abutment to vent fluid under pressure from said brake pipe, another movable abutment of larger area than the first mentioned movable abutment and operatively connected thereto, a chamber intermediate said abutments communicating with said auxiliary reservoir, a chamber at the outer face of each of said abutments communicating with the brake pipe, and a spring acting on the abutment of greater area in opposition to the pressure of fluid from the auxiliary reservoir.

36. The combination with a triple valve including a triple piston, a slide valve, and an associated quick service controlling valve movable relatively to each other by lost motion of the piston with respect to at least one of said valves; of a measuring chamber; an exhaust port; a quick service port; and ports in said slide valve and quick service controlling valve operative as the piston moves toward service position, first to connect the quick service port and the measuring chamber with the exhaust port, and then to disconnect them from the exhaust port while maintaining the connection between said quick service port and said measuring chamber, the parts being so arranged that as the triple piston returns toward release position, it shifts the controlling valve leaving the slide valve at rest, such shifting serving to disconnect the quick service port from the measuring chamber and to connect the measuring chamber with the exhaust port.

37. In a fluid pressure brake, the combination with a brake pipe and an auxiliary reservoir adapted to be charged with fluid under pressure from said brake pipe, of two abutments movable relative to each other, one of said abutments being movable upon an increase in brake pipe pressure and the other of said abutments being movable upon an increase in auxiliary reservoir pressure, and valve means controlling a communication through which fluid under pressure is adapted to be supplied from the brake pipe to the auxiliary reservoir and first operated upon an increase in brake pipe pressure on said one abutment for opening said communication and then operated upon an increase in auxiliary reservoir pressure and movement of said other abutment relative to the first abutment for closing said communication.

38. In a fluid pressure brake, the combination with a brake pipe and an auxiliary reservoir, of valve means for controlling a charging communication to said auxiliary reservoir, and two abutments movable independently of and relatively to each other for controlling the operation of said valve means, one of said abutments being movable by an increase in brake pipe pressure to operate said valve means to open said communication and the other of said abutments being movable by an increase in auxiliary reservoir pressure to operate said valve means to close said communication.

CARL O. GLENN.